March 15, 1960 R. C. JOHNSON ET AL 2,928,672
STACK WEIGHT
Filed Feb. 18, 1957 3 Sheets-Sheet 2

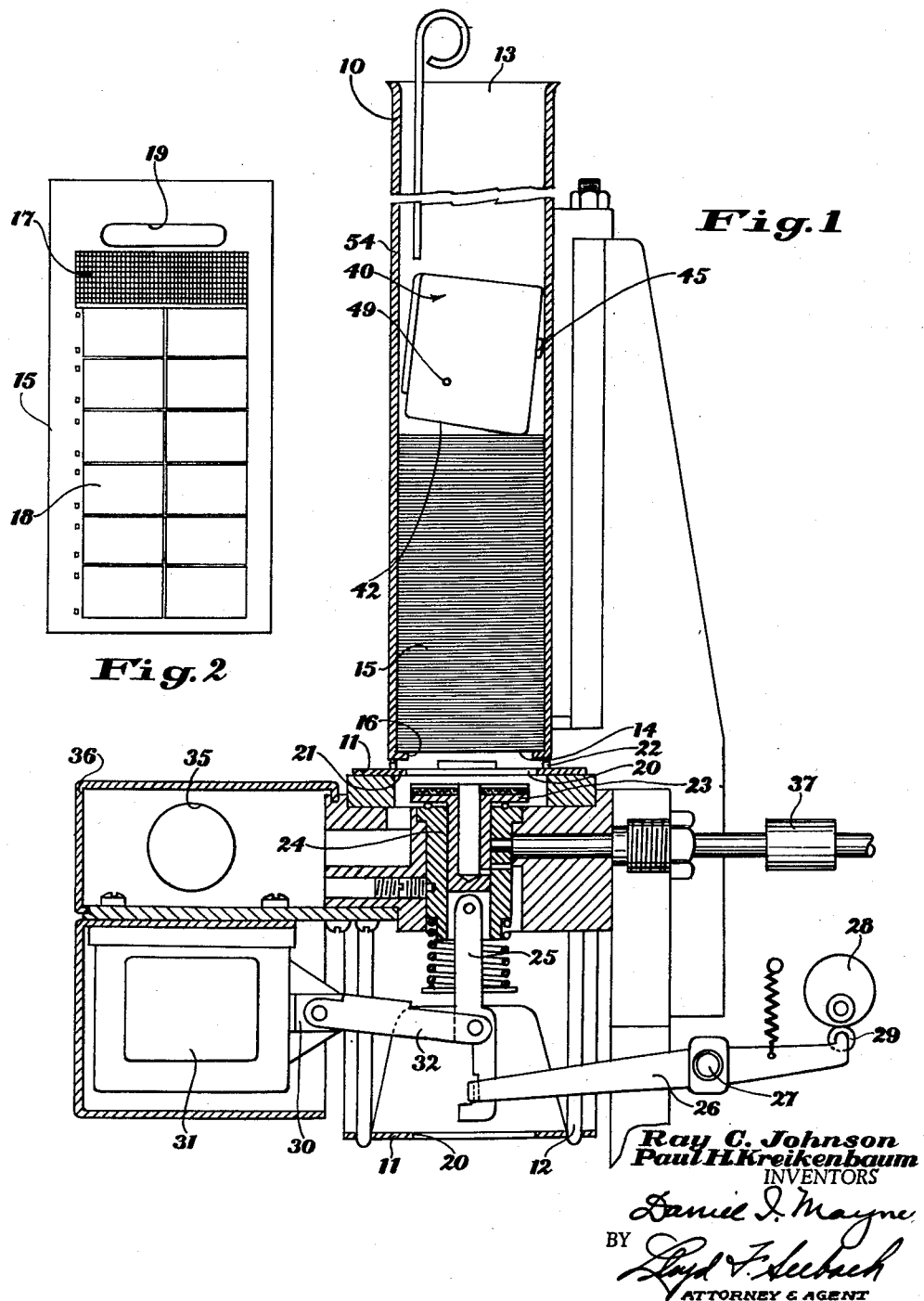

Ray C. Johnson
Paul H. Kreikenbaum
INVENTORS

BY
ATTORNEY & AGENT

March 15, 1960  R. C. JOHNSON ET AL  2,928,672
STACK WEIGHT

Filed Feb. 18, 1957  3 Sheets-Sheet 3

Ray C. Johnson
Paul H. Kreikenbaum
INVENTORS

BY
ATTORNEY & AGENT

United States Patent Office 2,928,672
Patented Mar. 15, 1960

2,928,672

STACK WEIGHT

Ray C. Johnson, Rochester, N.Y., and Paul H. Kreikenbaum, Fort Wayne, Ind., assignors, by direct and mesne assignments, to Eastman Kodak Company, Rochester, N.Y., a corporation of New Jersey Application February 18, 1957, Serial No. 640,902

9 Claims. (Cl. 271—32)

The invention relates to apparatus in which a stack of discrete elements are retained in an open end receptacle and are subjected to a repetitive force delivered thereto as the elements are successively withdrawn from or inserted into the receptacle and more particularly to a weight for stabilizing and limiting the movement of the elements due to said force.

In apparatus for sorting and/or delivering discrete elements which are relatively thin, the elements are usually stacked in a receptacle and removed from or inserted therein by a reciprocating member which is moved into contact with the stack. As a result, the reciprocating member delivers a blow or a force to the stack which causes the elements at the top of the stack to flutter and, as a result, can cause the elements to become disarranged within the receptacle. Also, in order to obtain the most effective withdrawal of the lowermost element in the stack, it is essential that the elements be maintained in flat and contiguous relation, particularly if the elements are of a thickness and weight which permit them to be readily deformed or possess any inherent qualities, such as curl. Such conditions may exist in apparatus utilized for the handling, sorting or transporting of elements made from paper, film and even thin metal blanks.

The invention is disclosed and described in conjunction with apparatus for sorting pieces of film which contain both photographic images of documents and code related to the document images. As is well known in the photographic art, abrasion of the surfaces of a film is to be avoided in order that the reproduction qualities thereof are not impaired. For this reason, it is necessary to take every precaution in order to insure that abrasion does not take place. In the disclosed apparatus a stabilizing member or stack weight is utilized in the receptacle in which the elements are stacked to prevent fluttering of the uppermost elements in the stack by damping any force applied to the elements or receptacle which tends to move the stack away from the supporting lips. In known types of sorters, the elements are arranged in a stack within a receptacle and the mechanism is operable to either insert or move the element into the receptacle or to withdraw the elements from the receptacle. In the apparatus utilizing the invention, the receptacle is capable of both receiving or having the element inserted therein as well as having the element withdrawn therefrom, the mechanism associated with the receptacle being capable of selectively performing this dual function.

The primary object of the invention is, therefore, to provide a device which is insertable in a receptacle and, when in engagement with the stack of elements therein, will mitigate undesirable stack oscillations due to any force which tends to move the stack with respect to the supporting means therefor.

Another object of the invention is to provide a stack weight which is insertable in a receptacle and is provided with a braking member permitting movement thereof in a direction toward the uppermost elements and which is movable into engagement with a wall of the receptacle with increased force to limit movement of the weight in the other direction by any force applied to the lowermost element which tends to move said elements from the supporting means therefor.

Still another object of the invention is to provide a stack weight having a braking member in which the center of gravity is displaced so that when said weight is inserted in the receptacle a rotational force is provided which is resolvable into forces exerted against the wall of the receptacle and the elements whereby the braking member is thrust against the wall of the receptacle with an increased force to prevent movement of the weight in a direction away from said elements by any force applied to the lowermost element which tends to move the stack with respect to the supporting means therefor.

And yet another object of the invention is to provide a stack weight having a braking member which is pivotally mounted within the weight and is provided with a resilient arm and which permits movement of the weight toward the uppermost element when inserted in the receptacle and limits the movement of the weight in the opposite direction, the force with which the braking member is thrust against the wall of the receptacle by any force applied to the lowermost element which tends to move said elements away from the supporting means therefor being limited by deformation of the resilient arm.

The invention is disclosed in conjunction with a device for sorting rectangular-shaped pieces of film having a code area and a document image area and provided with an elongated transverse aperture adjacent one edge thereof. The pieces of film are relatively small in size and are of the order of five eighths of an inch in width by one and a quarter inches in length. Since the size and nature of the film is such that individual handling is prohibitive, the elements are handled for insertion and withdrawal from the apparatus, in other words, for loading and unloading the receptacle by means of a rod or stick which is inserted in the transverse aperture. By this device the elements are inserted into or withdrawn from an open end receptacle having lips adjacent one open end thereof for supporting the elements in a stacked and aligned relation superposed one upon the other.

The elements are withdrawn successively from the bottom of the feed receptacle and deposited on a conveying means for movement to another receptacle. When the element is aligned with the proper receptacle, the element is then inserted into the receptacle, insertion and/or withdrawal being made with respect to the same open end of the receptacles. Insertion of the element is accomplished by a reciprocating feed member and withdrawal is accomplished by the same member in conjunction with a vacuum applied thereto only during the interval of withdrawal. The feeding member is moved beyond the plane of the lowermost element in its extreme position in order to guarantee actual contact with the lowermost element for withdrawal and to bow the element past the stack supporting lips upon insertion. Since no restraining means is utilized with respect to the feed member, the stack of elements receives an impact blow with each engagement by the feed member. This force which is applied to the stack is transmitted through the stack and causes the elements at the top of the stack to flutter and to become disarranged with the possibility of also jamming the receptacle. By this action, the problem of abrasion is also introduced.

In order to overcome these difficulties, a stack weight having a braking member integral therewith is inserted in the open end of the receptacle opposite said stack retaining lips. The braking member permits the weight to move freely toward and into engagement with the stack and to follow the stack as it decreases in height. The weight serves to maintain the elements in intimate contact as well as to prevent fluttering of the uppermost elements. The action of the brake member is one of reaction to the force applied to the stack by the feeding member whereby the braking member is thrust against the wall of the receptacle with an increased force to prevent movement of the stack weight in a direction away from the uppermost element in the stack. A small amount of lost motion is permitted to allow for movement of the feed member past the plane of the lowermost element so the braking action is not applied too soon nor too abruptly. In one of the embodiments disclosed herein, the braking member includes a resilient arm which, when the force with which the braking arm is thrust against the wall of the receptacle becomes too great, will deform the resilient arm thereby limiting the braking action or force.

Other objects and advantages will be apparent to those skilled in the art by the more detailed description which follows.

Reference is now made to the accompanying drawings wherein like reference numerals designate like parts and wherein:

Fig. 1 is a vertical section through one of the receptacles and showing the relation of the various elements to the receptacle for effecting insertion or withdrawal of the elements;

Fig. 2 is a detail plan view of an element handled in the apparatus disclosed in Fig. 1;

Figure 3:
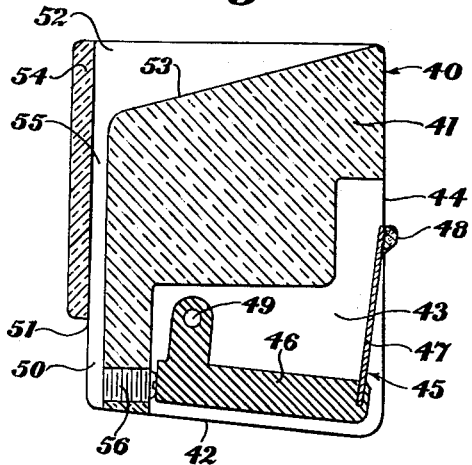
Fig. 3 is a vertical section taken substantially on line 3—3 in Fig. 4 and showing the structure of one embodiment of a stack weight.

In the apparatus shown in Fig. 1, the receptacle 10 is one of a plurality of like receptacles arranged over and adjacent to a conveyor belt 11 which is moved intermittently in any well-known manner, such as by the intermittently driven sprocket 12. Receptacle 10 has open ends 13 and 14, the elements 15 being inserted or loaded and withdrawn or unloaded from receptacle 10 via open end 13. Open end 14 is provided with marginal lips 16 which support elements 15 in their superposed and stacked relation within the receptacle.

Elements 15, as shown in Fig. 2, are small rectangular pieces of film and comprise a code area 17 and a document image area 18, each element being provided with an elongated slot 19. By means of a stick or rod having a cross-section similar to aperture 19 and movable retaining members positioned on the end of the stick, a stack of elements 15 can be easily removed from receptacle 10 and in a like manner be inserted therein. For this purpose, receptacles 10 can be pivotally mounted to facilitate removal or placement of the retaining member.

Conveyor 11 is provided with spaced openings 20 having marginal lips 21 and edge guides 22 so that each element deposited thereon is retained in proper position. Immediately below each of receptacles 10, a plunger 23 is slidably mounted in sleeve 24 and is reciprocated by means of link 25 and arm 26 which is connected to said link and pivotally mounted at 27, said arm being oscillated by cam 28 in engagement with the follower roll 29.

Cam 28 is continuously rotated in synchronism with the movement of conveyor belt 11, the timing being such that plunger 23 is reciprocated during the interval belt 11 is stationary and during which interval openings 20 are aligned with the open ends 14 of receptacles 10. Normally, the armature 30 of solenoid 31, which is connected by link 32 to link 25, maintains link 25 in a position in which arm 26 is free to oscillate without actuating plunger 23. However, upon energization of solenoid 31, armature 30 and link 32 move link 25 to the left and into engagement with arm 26. Plunger 23 is then moved upwardly to move the element 15 on belt 11 into open end 14 of the receptacle or to contact the lowermost element for withdrawal from the receptacle and deposition on belt 11.

It is to be understood, of course, that for insertion or withdrawal of an element 15, plunger 23 is moved through the opening 20 in belt 11. Aperture 35 in casing 36 is connected to a suitable pump so that a slight vacuum is created beneath belt 11 to assist in retaining elements 15 on the belt during movement thereof. Also, valve 37 controls the application of a vacuum to plunger 23 when an element is to be withdrawn from the receptacle. By means of the circuitry associated with the apparatus, any one of the receptacles 10 can be designated as the feed receptacle. In this case, solenoid 31 which is associated with the feed receptacle will be energized as long as there are elements 15 in the receptacle to be withdrawn. In other words, plunger 23 is continuously reciprocated and with each movement of plunger 23 into engagement with the stack, valve 37 supplies the vacuum to plunger 23 to withdraw the element past lips 16 and deposit it on belt 11 and over an opening 20. The code on each element determines the receptacle into which the element is to be inserted. As a result, the withdrawn elements, i.e., the elements positioned on belt 11 by plunger 23, are moved past a reading station. The signals derived from the code cause the proper solenoid 31 to be energized when the element is aligned with respect to the corresponding receptacle. The plunger 23, which is associated with the designated receptacle, then moves the element from belt 11, past lips 16 and into the receptacle, there being no vacuum applied to plunger 23 when it is acting as an inserting member.

Figure 4:
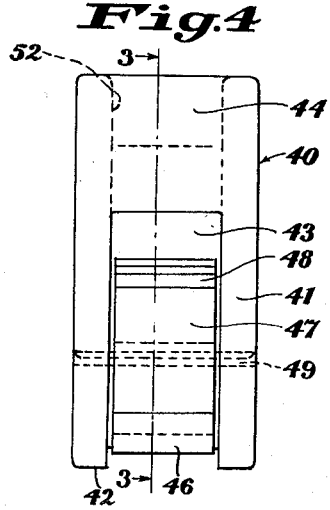
Fig. 4 is a front elevation view of the stack weight shown in Fig. 3.

From the foregoing description of the apparatus, it is evident that the stacks of elements in the receptacles are subjected to repeated impacts by the plungers 23 both upon insertion and withdrawal of the elements with respect to the receptacles. This impact force is transmitted throughout the height of the stack and causes the stack as well as the uppermost elements to separate and to become disarranged in spite of the fact that the internal dimensions of the receptacle and the overall dimensions of the elements are maintained within very close limits. In order to eliminate this tendency of the elements to flutter and become disarranged, a weight 40 of the type shown in Figs. 1, 3 and 4 has been devised. With reference particularly to Fig. 3, weight 40 comprises a body 41 which is preferably made or molded of a plastic material, such as polystyrene. Since the weight 40 must be free to move as the stack decreases in size and must also be moved upward in the receptacle as the stack increases in size, polystyrene has been found to be very satisfactory because of its dimensional stability and relatively low coefficient of friction. The length and width of body member 41 is dimensionally smaller than the inside of receptacle 10 and the bottom 42 is inclined at an angle to the horizontal. Body 41 is also provided with a cavity 43 which is open to one side 44 and bottom 42. Within cavity 43, a braking member 45 comprising an operating member 46 which is an L-shaped metallic arm, a resilient metallic arm 47 and a block 48 of friction material having a relatively high coefficient of friction is pivotally mounted at 49 to body 41. Body member 41 is also provided with a vertical recess 50 along side 51 and a recess 52 which has a sloping surface 53 leading to recess 50. Recess 50 is covered by plate 54 to provide a slot 55 so that recess 52 and surface 53 serve to direct the end of the stick or rod referred to hereinabove to slot 55 and then to the aligned apertures 19 when it is desired to remove a stack of elements from a receptacle. From Figs. 1, 3 and 8, it will be noted that plate 54 does not extend the full length of side 51.

Figure 8:
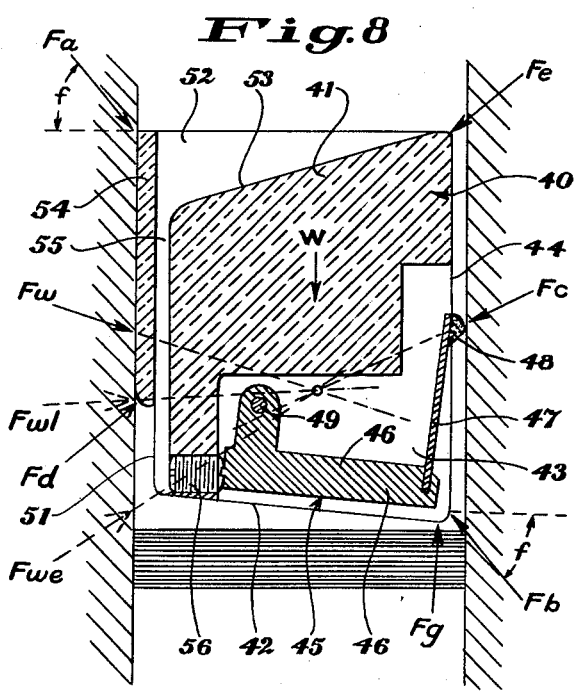
Figs. 8 and 9 are sectional views showing the two embodiments of the weights in the positions assumed when inserted in a receptacle.

Since it is necessary for weight 40 to follow the stack as it decreases or increases in size, the force system normally exerted externally of the weight by the receptacle walls and the stack of elements must not attain a state of static equilibrium. Such a state of equilibrium could exist due to forces Fa, Fb and W, as shown in Fig. 8. However, by choosing a suitable material for body 41 so that the coefficient of friction is not large enough for the friction angle $f$ to exist without slippage, weight 40 will move freely downward and the force system Fa, Fb and W cannot, therefore, be attained. Force system Fwe, W and Fc could also provide a condition of static equilibrium, but the force Fwe cannot exist because plate 54 does not extend the full length of side 51. Receptacle 10 could exert the force Fwl which would require the force Fc to pass above the pivot point 49 but such a condition would cause braking member 45 to rotate in a counterclockwise direction to decrease force Fc to zero and would, therefore, release weight 40 for downward movement. Under normal conditions, the force exerted by the receptacle wall will be Fw and the existence of forces Fw, Fc and W has a resultant downward component which causes weight 40 to fall freely downward. As a result, the force system Fc, W and the receptacle wall force due to either Fw, Fwe or Fwl cannot produce a state of static equilibrium to hang up weight 40 in the receptacle.

There is also the possibility of the force system Fd, Fe and W providing a state of static equilibrium. While these forces existing by themselves could attain such a state, the inclined bottom 42 of body 41 provides a force Fg, when in contact with the stack, which introduces a counterclockwise torque on weight 40 and thereby diminishes the force Fd to a point whereby the weight falls freely. From the foregoing discussion of the forces exerted on weight 40, it is evident that plate 54, which does not extend the length of side 51, and inclined bottom 42 of body 41 insure the elimination of any state of static equilibrium which would hang weight 40 within the receptacle.

Due to the shape of braking member 45 and its arrangement within body 41, the center of gravity of weight 40, as compared with the center of gravity of body 41, is shifted in the direction toward side 44. The pivotal relationship of arm 46 results in block 48 being moved through the open side of cavity 43 and urged against the wall of receptacle 10 to maintain contact with the wall at all times. When plunger 23 contacts the lowermost element for the purpose of insertion or withdrawal of an element, weight 40 is moved upward and tilted to the left by the impact force transmitted through the stack. This relative movement of weight 40 with respect to receptacle 10 causes arm 46 to move in a clockwise direction, thereby moving the action line of force Fc below pivot 49 and thrusting block 48 against the wall of the receptacle with an increased force to retard movement of weight 40. However, if the impact force on the stack is relatively great, the resulting movement of arm 46 is arrested by contact with screw 56 to cause deformation of arm 47 so that the increased force exerted by block 48 is still increased sufficiently to impede movement of weight 40 in an upward direction and does not arrest weight 40 too quickly so as to interfere with the necessary movement of plunger 23. It has been found that the weight 40 by proper choice of geometric relations and of the block and arm materials can also be made relatively insensitive to waviness in the wall surfaces of the receptacle.

Figure 5:
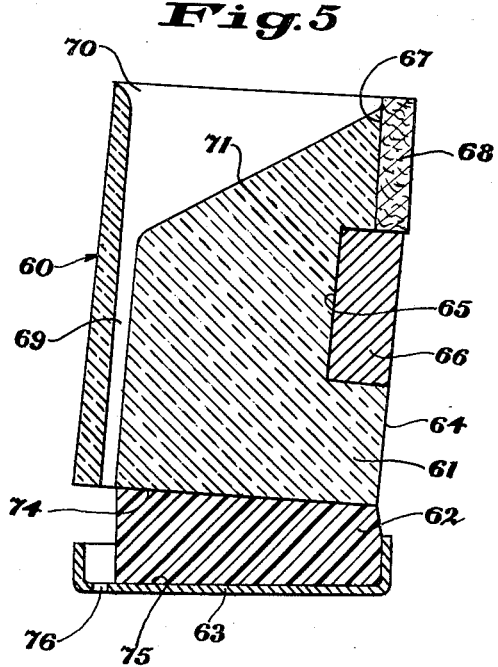
Fig. 5 is a vertical section taken substantially on line 5—5 in Fig. 6 and showing the structure of another embodiment of a stack weight.
Figure 7:
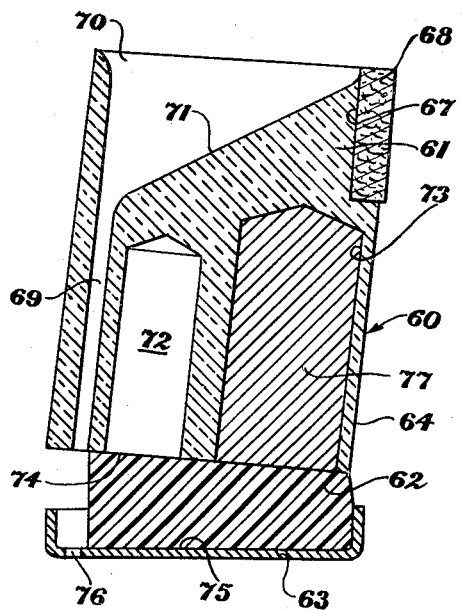
Fig. 7 is a vertical section through a stack weight similar to that shown in Fig. 5 and discloses another arrangement of weighting.
Figure 6:
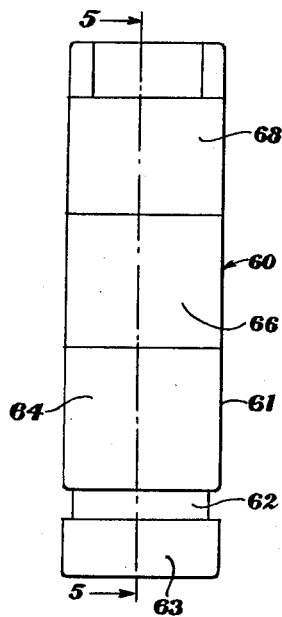
Fig. 6 is a front elevation view of the stack weight shown in Fig. 5.

In Figs. 5 and 6 another embodiment of the invention is disclosed by which the same principles of operation are accomplished. Weight 60 comprises a body member 61, preferably made or molded of a plastic material, such as polystyrene, a shock-absorbing member 62 and an element engaging plate 63. Body member 61 is provided on one side 64 with a recess 65 in which a material 66 having a specific gravity greater than that of body 61 is arranged. Over recess 65, a second recess 67 is provided in which a block 68 of material having a high coefficient of friction is arranged, the outer surface of block 68 extending beyond side 64, as shown in Fig. 5. Body member 61 is also provided with a vertical slot 69 and a recess 70 having a sloping surface 71 for directing the stick to slot 69 as described hereinabove. As shown in Fig. 7, body member 61 can be provided with a blind hole 72 and a second blind hole 73 which is filled with a weighting material 77, such as small shot, lead, sand, Cerromatrix which is an alloy of bismuth, tin, lead and antimony, or similar materials. The hole 72 can be utilized to lighten body member 61 for the purpose about to be described or can also be filled with a weighting material, if it is found that additional weight is desirable.

By weighting body member 61 in either of the manners described above, the center of gravity of weight 60 is shifted toward the weighted side. This shift of the center of gravity is also enhanced by mounting body 61 on the surface 74 of shock-absorbing member 62 which is inclined to the horizontal and with respect to the opposite surface 75 thereof to which plate 63 is secured, as shown in Fig. 6. Inasmuch as member 62 is preferably made of sponge rubber and rubber normally has an adverse effect on photographic film emulsions, it is necessary to provide plate 63 as the element engaging member. To permit passage of the stick into apertures 19, plate 63 is also provided with an elongated slot 76.

Figure 9:
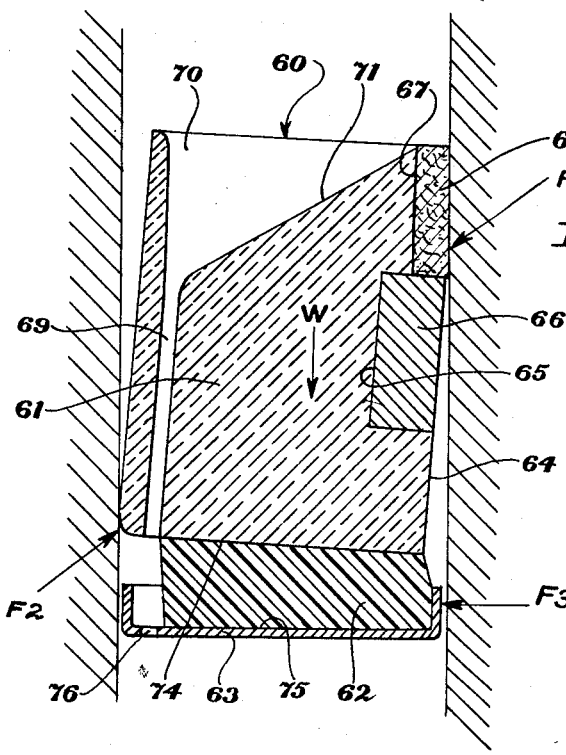

When weight 60 is inserted in the open end 13 of a receptacle 10, body 61 must shift relative to plate 63 in order to position it in the receptacle. This results, as shown in Fig. 9, in a substantial alignment of body 61 and plate 63, whereby the deformation of member 62 creates forces together with the force W caused by body 61 and material 67 which urges block 68 against the walls of the receptacle. These forces can be resolved into forces F1, F2, and F3 exerted against opposed walls of receptacle 10, as denoted by the arrows in Fig. 9. As weight 60 moves toward the uppermost element and with respect to receptacle 10, the drag or force exerted against block 68 negatives the thrust due to pad 62 and body 61, i.e., body 61 tends to rotate in a counterclockwise direction and weight 60 moves freely downward into engagement with the stack and follows the stack as it decreases in height. As long as force W, the gravitational pull on weight 60 is sufficiently large in magnitude, forces F1, F2, and F3 cannot be in equilibrium and weight 60 must move downwardly without any possibility of jamming. As in the other embodiment of the invention described above, any force applied to the stack, as by plunger 23, is transmitted through the stack to weight 60 and moves it upward. This impact force causes body 61 to effectively rotate in a clockwise direction due to the displacement of the center of gravity by material 66 and block 68 is, therefore, urged toward the wall of receptacle 10 to retard movement of weight 60 in an upward direction and away from elements 15. The upward movement of weight 60 is slight with plate 63 remaining in contact with the uppermost element 15 so that fluttering of elements 15 is practically eliminated, the major portion of the upward movement being absorbed by deformation of pad 62 and being sufficient to permit plunger 23 to travel the required distance past the lowermost element to properly insert or withdraw an element.

From the foregoing description, it is evident that two embodiments of a stack weight has been disclosed which successfully mitigate stack oscillations and offer external resistance to stack motion only when oscillations are being incited. Under steady state motion, the described weights offer a small amount of resistance to the stack and any sudden change in motion thereof causes mitigation of the stack oscillations. In addition, the weights maintain compactness of the stack under all conditions of operation and thereby avert intolerable excitation of the stack due to the impact force of the plunger.

Since other modifications of the invention will be apparent to those skilled in the art, the embodiments disclosed and described are merely illustrative of the invention and the scope of the invention is defined by the appended claims.

Having now particularly described our invention, what we desire to secure by Letters Patent of the United States and what we claim is:

1. In combination with a vertical receptacle having open ends and lips adjacent one open end for supporting a plurality of discrete elements in superposed relation therein, a member insertable in the other open end of said receptacle and freely movable in a direction toward said elements into a position for engaging the uppermost element in said receptacle, said member having its center of gravity displaced toward one of the walls of said receptacle to provide a force resolvable into forces exerted against said one wall, the wall opposite said one wall and said elements, and a braking member carried by said member for engaging the one wall of said receptacle, said braking member being urged against the one wall with an increased force to retard movement of said member toward said other open end upon the application of any force to the lowermost element which tends to move said elements away from said lips.

2. In combination with a vertical receptacle having open ends and lips adjacent one open end for supporting a plurality of discrete elements in superposed relation therein, a member insertable in the other open end of said receptacle, means fixed to said member for engaging the uppermost element in said receptacle, said member being laterally displaced in one direction with respect to said engaging means, weight means carried by said member for shifting the center of gravity of said member in a direction opposed to the displacement of said member with respect to said engaging means, and braking means carried by said member on the side thereof toward which the center of gravity has been shifted for engaging one of the walls of said receptacle and permitting said member to move freely in a direction toward said elements, the displacement of said member and the shifting of the center of gravity of said member providing a force, when said member is in said receptacle, which is resolvable into forces exerted against opposed walls of the receptacle and against said elements whereby the force with which said braking means is thrust against the wall is increased to retard movement of said member toward said other open end upon the application of any force to the lowermost element which tends to move said elements away from said lips.

3. In combination with a vertical receptacle having open ends and lips adjacent one open end for supporting a plurality of discrete elements in superposed relation therein, a member having a recess disposed to one side of the center of gravity thereof and insertable in the other open end of said receptacle, weight means arranged in said recess for shifting the center of gravity of said member in the direction of disposition of said recess, means fixed to said member for engaging the uppermost element in said receptacle, said member being laterally displaced in one direction with respect to said engaging means, and braking means carried by said member on the side thereof toward which the center of gravity has been shifted for engaging one of the walls of said receptacle and permitting said member to move freely in a direction toward said elements, the displacement of said member and the shifting of the center of gravity of said member providing a force, when said member is in said receptacle, which is resolvable into forces exerted against opposed walls of the receptacle and against said elements whereby the force with which said braking means is thrust against the wall is increased to retard movement of said member toward said other open end by any force applied to the lowermost element which tends to move said elements away from said lips.

4. In combination with a vertical receptacle having open ends and lips adjacent one open end for supporting a plurality of discrete elements in superposed relation therein, a member having a recess disposed to one side of the center of gravity thereof and insertable in the other open end of said receptacle, weight means having a specific gravity greater than said member arranged in said recess for shifting the center of gravity of said member in the direction of disposition of said recess, resilient means fixed to said member for engaging the uppermost element in said receptacle, said member being angularly displaced with respect to said resilient means, and braking means carried by said member on the side thereof toward which the center of gravity has been shifted for engaging one of the walls of said receptacle and permitting said member to move freely in a direction toward said elements, the angular displacement and shifting of the center of gravity of said member together with said resilient means providing a force, when said member is in said receptacle, which is resolvable into forces exerted against opposed walls of the receptacle and against said elements whereby the force with which said braking means is thrust against the wall is increased to retard movement of said member toward said other open end by any force applied to the lowermost element which tends to move said elements away from said lips.

5. In combination with a vertical receptacle having open ends and lips adjacent one open end for supporting a plurality of discrete elements in superposed relation therein, a member having a recess disposed to one side of the center of gravity thereof and insertable in the other open end of said receptacle, weight means having a specific gravity greater than said member arranged in said recess for shifting the center of gravity of said member in the direction of disposition of said recess, a rubber block having non-parallel opposed surfaces, one of said surfaces being secured to said member for tilting said member in the direction of disposition of the center of gravity, a plate secured to the other of said surfaces for engaging the uppermost element in said receptacle, and braking means carried by said member on the side thereof toward which the center of gravity has been shifted for engaging one of the walls of said receptacle and permitting said member to move freely in a direction toward said elements, the tilting and shifting of the center of gravity of said member together with said rubber block providing a force, when said member is in said receptacle, which is resolvable into forces exerted against opposed walls of said receptacle and said elements whereby the force with which said braking means is thrust against the wall is increased to retard movement of said member toward said other open end by a force applied to the lowermost element which tends to move said elements away from said lips.

6. In combination with a vertical receptacle having open ends and lips adjacent one open end for supporting a plurality of discrete elements in superposed relation therein, a member having one surface thereof inclined to the horizontal to provide only partial engagement thereof with the uppermost element, when said member is inserted in the other open end of said receptacle, and provided with a cavity open on one side to one of the walls of said receptacle and open on another side to said inclined surface, a braking member pivotally mounted within said cavity and having a portion thereof movable through the one open side for engaging said one wall of the receptacle, said braking member permitting said member to move freely in a direction toward the uppermost element in said receptacle and with said member providing a force, when said member is in said receptacle, which is resolvable into forces exerted against opposed walls of the receptacle and against said elements whereby the force with which said braking means is thrust against the wall is increased to retard movement of said member toward said other open end by the application of any force to the lowermost element which tends to move said elements away from said lips.

7. In combination with a vertical receptacle having open ends and lips adjacent one open end for supporting a plurality of discrete elements in superposed relation therein, a member having one surface thereof inclined to the horizontal to provide only partial engagement thereof with the uppermost element, when said member is inserted in the other open end of said receptacle, and provided with a cavity open on one side to one of the walls of said receptacle and open on another side to said inclined surface, a braking member pivotally mounted within said cavity and having a portion thereof movable through the one open side for engaging said one wall of the receptacle, said braking member permitting said member to move freely in a direction toward the uppermost element in said receptacle and causing a shift of the center of gravity of said member in a direction toward said one wall of the receptacle to provide a force which is resolvable into forces exerted against opposed walls of the receptacle and against said elements whereby the force with which said braking means is thrust against the wall is increased to retard movement of said member toward said other open end by the application of any force to the lowermost element which tends to move said elements away from said lips.

8. In combination with a vertical receptacle having open ends and lips adjacent one open end for supporting a plurality of discrete elements in superposed relation therein, a member insertable in said receptacle and provided with a cavity open on one side to one of the walls of the receptacle, an operating member pivotally mounted within said cavity and shifting the center of gravity of said member in the direction of said one wall of the receptacle, a resilient member having one end fixed to said operating member and the other end free, the free end carrying a block of material having a high coefficient of friction and which extends through the one open side of said cavity and engages the wall of said receptacle, said operating member, resilient member and block together forming a braking means which permits said member to move freely in a direction toward the uppermost element in the receptacle, when inserted therein, and provides a force which is resolvable into forces exerted against the one wall of said receptacle and said elements whereby the force which thrusts said block against the wall of the receptacle is increased by any force applied to the lowermost element which tends to move said elements away from said lips and is limited by deformation of said resilient member.

9. In combination with a vertical receptacle having open ends and lips adjacent one open end for supporting a plurality of discrete elements in superposed relation therein, a non-metallic member having one surface thereof inclined to the horizontal to provide only partial engagement thereof with the uppermost element, when said member is inserted in the other open end of said receptacle, and provided with a cavity open on one side to one of the walls of said receptacle and open on another side to said inclined surface, an operating member pivotally mounted within said cavity and having a specific gravity greater than said member to move the center of gravity of said member in the direction of said one wall of the receptacle, a resilient arm having one end fixed to said operating member and the other free, the free end carrying a block of material having a high coefficient of friction and which extends through the one open side of said cavity and engages the wall of said receptacle, said operating member, resilient arm and block together forming a braking means which permits said member to move freely in a direction toward the uppermost element in said receptacle, when inserted therein, and with said member provides a force which is resolvable into forces exerted against opposed walls of said receptacle and said elements whereby the force which thrusts said block against the wall of the receptacle is increased by any force applied to the lowermost element which tends to move said elements away from said lips and is limited by deformation of said resilient arm.

References Cited in the file of this patent

UNITED STATES PATENTS

| 1,090,721 | Kaspar | Mar. 17, 1914 |
| 2,059,254 | Lasker | Nov. 3, 1936 |
| 2,811,352 | Bornemann | Oct. 29, 1957 |

FOREIGN PATENTS

| 907,384 | Germany | Mar. 25, 1954 |